United States Patent
Poorte et al.

(10) Patent No.: US 6,773,235 B2
(45) Date of Patent: Aug. 10, 2004

(54) ROTODYNAMIC MULTI-PHASE FLOW BOOSTER PUMP

(75) Inventors: Raimo Edwin Gregor Poorte, Rijswijk (NL); Paulus Henricus Joannes Verbeek, Rijswijk (NL)

(73) Assignee: Shell Oil Company, Houston, TX (US)

( * ) Notice: Subject to any disclaimer, the term of this patent is extended or adjusted under 35 U.S.C. 154(b) by 203 days.

(21) Appl. No.: 10/169,411

(22) PCT Filed: Dec. 29, 2000

(86) PCT No.: PCT/EP00/13356
§ 371 (c)(1),
(2), (4) Date: Jul. 1, 2002

(87) PCT Pub. No.: WO01/50024
PCT Pub. Date: Jul. 12, 2001

(65) Prior Publication Data

US 2003/0010502 A1 Jan. 16, 2003

(30) Foreign Application Priority Data

Dec. 31, 1999 (EP) ............................................ 99204604
Jan. 5, 2000 (EP) ............................................ 00200041

(51) Int. Cl.[7] ........................... F04B 49/00; F04B 49/06; F04B 19/24
(52) U.S. Cl. ............................ 417/1; 417/44.1; 417/43; 417/53
(58) Field of Search ............................ 417/1, 44.1, 43; 415/53

(56) References Cited

U.S. PATENT DOCUMENTS

| | | | |
|---|---|---|---|
| D127,167 S | * 5/1941 | Bahr | D23/413 |
| 3,568,771 A | 3/1971 | Drake et al. | |
| 3,909,603 A | 9/1975 | Nicolas | 235/151.34 |
| 4,526,513 A | * 7/1985 | Bogel | 417/56 |
| 4,586,852 A | * 5/1986 | Oda et al. | 406/14 |
| 4,856,344 A | 8/1989 | Hunt | 73/861.04 |
| 5,193,983 A | * 3/1993 | Shyu | 416/236 A |
| 5,361,206 A | 11/1994 | Tabeling et al. | 364/422 |
| 5,472,319 A | 12/1995 | Rohlfing et al. | 417/307 |
| 5,624,535 A | * 4/1997 | Tsuchikawa et al. | 204/228.2 |
| 5,899,844 A | * 5/1999 | Eberle, Sr. | 494/37 |

FOREIGN PATENT DOCUMENTS

| | | | | |
|---|---|---|---|---|
| EP | 0 549 439 | 6/1993 | ........... | F04D/15/00 |
| EP | 0 917 905 | 5/1999 | | |
| FR | 2 724 200 | 3/1996 | ........... | E21B/43/01 |
| FR | 2 774 135 | 7/1999 | ........... | F04B/19/24 |
| GB | 2215408 A | 9/1989 | | |
| GB | 2 298 239 | 8/1996 | ........... | F04D/15/00 |
| WO | 93/04288 | 3/1993 | | |

* cited by examiner

Primary Examiner—Justine R. Yu
Assistant Examiner—Timothy P. Solak

(57) ABSTRACT

A method and system for optimizing the performance of a rotodynamic multi-phase flow booster, such as a wet gas compressor, utilizes a meter which measures the fluid density $\rho$ upstream of the booster and controls the speed of rotation $\Omega$ of the rotor(s) of the booster, such that the booster operates at its best efficiency point (BEP) irrespective of variations of the fluid density $\rho$. Suitably the flow booster is a wet gas compressor having rotor and/or stator blades having a rough leading edge and non-wettable sides, which promote a favorable finely, dispersed mist flow so that the compressor also operates at its BEP if the compressed wet gas has a high liquid content.

16 Claims, 1 Drawing Sheet

ROTODYNAMIC MULTI-PHASE FLOW BOOSTER PUMP

BACKGROUND OF THE INVENTION

The invention relates to a method and system for optimizing the performance of a rotodynamic multi-phase flow booster, such as a rotary pump or compressor for pumping a multi-phase gas/liquid mixture through a fluid transportation conduit.

Various types of rotodynamic pumps or compressors are known for boosting multi-phase flow. International patent application WO93/04288 discloses a contra-rotating pump or compressor of which the impeller blades are mounted on contra-rotating sleeves.

UK patent 2215408 discloses a system for controlling the gas-liquid ratio in a pump, wherein the gas-liquid ratio is maintained at a substantially constant level by extracting liquid from the downstream end of the pump and feeding the extracted liquid back to the pump inlet if the measured gas/liquid ratio exceeds a predetermined level.

U.S. Pat. No. 5,472,319 discloses an eccentric twin screw pump with liquid bypass controlled by a flexible diaphragm.

A disadvantage of the known multi-phase boosters is that the pumping efficiency varies in response to the density of the fluid mixture passing through the booster.

This variation can be particularly high in case gas and liquid slugs are passing alternatingly through the booster.

U.S. Pat. No. 3,568,771 discloses an electrical submersible oil well pump for lifting foamy crudes in which the rotary speed of the pump rotor(s) is varied as a function of the bulk density of the crude in the well bore. European patent application No. 0549439 discloses a multi-phase pump of which the speed of rotation is varied in response to variation of the gas/liquid ratio of the pumped multi-phase mixture.

An object of the present invention is to provide a method and system for further optimizing the performance of a rotodynamic flow booster, such as a gas/liquid compressor, such that the pumping efficiency is maintained at its best efficiency point if the density of the fluid mixture passing through the pump varies.

SUMMARY OF THE INVENTION

The method according to the invention for optimizing the performance of a rotodynamic multi-phase flow booster comprises measuring the density of the multi-phase fluid flow; and controlling the speed of rotation of a rotor of the pressure booster, characterized in that the density of the multi-phase fluid flow is measured at a location upstream of the rotary pressure booster, and in that the non-dimensional rotational speed $\Omega$ of said rotor is controlled in relation to the measured non-dimensional density $\rho$ of the multi-phase fluid on the basis of the algorithm:

$$\Omega = f \cdot \rho^n$$

wherein:
n is an exponent between −1/3 and −1 which is selected in relation to the mode of operation; and
f is a parameter which is determined by the geometry of the booster and the mode of operation, wherein the mode of operation is selected such that if the fluid mixture density $\rho$ varies either a) the mixture mass flow passing through the booster is maintained at a substantially constant level; or b) the power consumption of the booster is maintained at a substantially constant level; or c) the pressure difference between the outlet and the inlet of the booster is maintained at a substantially constant level.

Under the foregoing conditions the booster is expected to continue to operate at its best efficiency point (BEP) as with varying fluid mixture density and compositions the impellers or screws of the rotor(s) of the booster continuously create favourable fluid flow conditions such as a dispersed mist flow in which liquid droplets are finely dispersed in the gas phase or a dispersed bubble flow in which gas bubbles are finely dispersed in the liquid phase.

Suitably, the density and/or gas/liquid mass fraction of the multi-phase fluid mixture is measured by a gradio-venturi flowmeter or a wet gas tracer apparatus which is located in the conduit upstream of the flow booster.

The system according to the invention for optimizing the performance of a rotodynamic multi-phase flow booster comprises:
  a density measuring device for measuring the density of the multi-phase flow; and
  a rotary speed control unit for controlling the speed of rotation of a rotor of the booster in accordance with a predetermined algorithm, which controls the dimensionless speed of rotation $\Omega$ of said rotor, characterized in that the density measuring device is located upstream of the flow booster, and in that the dimensionless speed of rotation $\Omega$ is controlled in relation to the measured non-dimensional density $\rho$ of the multi-phase fluid on the basis of the algorithm:

$$\Omega = f \cdot \rho^n$$

wherein:
  n is an exponent between −1/3 and −1 which is selected in relation to the mode of operation; and
  f is a parameter which is determined by the geometry of the booster and the mode of operation, wherein the mode of operation is selected such that if the fluid mixture density $\rho$ varies either a) the mixture mass flow passing through the booster is maintained at a substantially constant level; or b) the power consumption of the booster is maintained at a substantially constant level;
  or c) the pressure difference between the outlet and the inlet of the booster is maintained at a substantially constant level.

The invention also relates to a rotodynamic multi-phase flow booster for use as a wet gas compressor and which is equipped with one or more rotor and/or stator parts having rotor and/or stator blades which are designed to transform liquid droplets which in use impinge upon the leading edges of the blades into a mist of smaller droplets which are and remain a finely dispersed mist in the gaseous phase.

Furthermore the invention relates to a rotor and/or stator blade suitable for use in such a wet compressor.

In such case the rotor blade comprises non-wettable sides, which are suitably coated with a polytetrafluorethylene or PTFE (sold by E. I. du Pont de Nemours and Company under the trademark "TEFLON") and a leading edge having a larger roughness than the sides.

Suitably the leading edge of the blade(s) is covered by a random array of grains having a grainsize of at least about 50 microns, which grains are separated by distances which are on average less than twice the grainsize.

Alternatively the leading edge of the blade(s) is provided with a series of riblets which have a square or triangular cross-sectional shape, which are substantially aligned with the direction of flow of the multi-phase fluid mixture and which have mutual spacings of at least 50 microns.

In a wet gas compressor which has a rotor and/or stator which is equipped with such rotor and/or stator blades a favourable mist flow of small liquid droplets which are finely dispersed in the gaseous phase will be maintained also if the wet gas has a high liquid content which also contributes to operation of the wet gas compressor at its best efficiency point (BEP) in circumstances that the gas has a high liquid content, which may exceed 10% of the volume of the wet gas mixture.

The invention will be described in more detail with reference to the accompanying drawing, of which should not be construed to limit the scope of the invention.

DETAILED DESCRIPTION OF THE INVENTION

Figure 1:
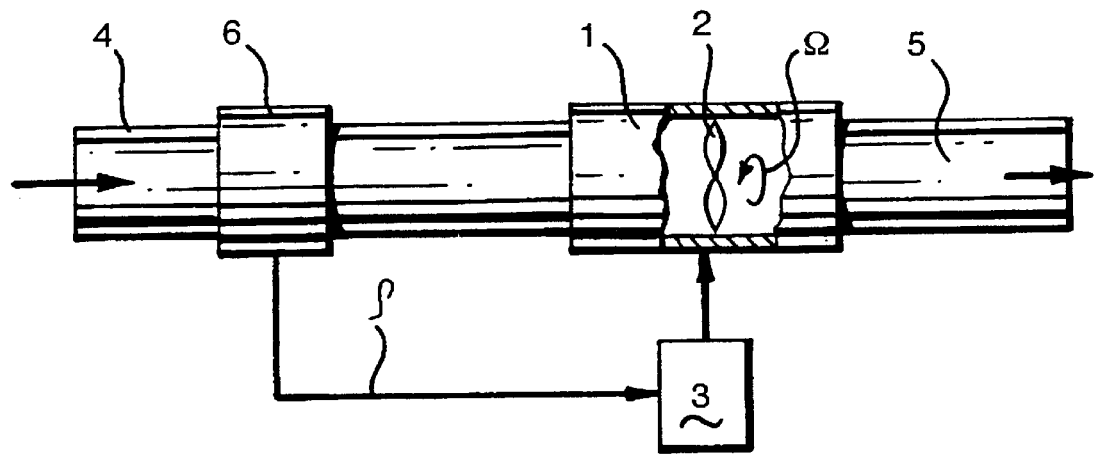
FIG. 1 schematically shows a multi-phase flow booster, wherein the rotary speed of the rotor(s) of the booster is varied in response to variations of the density of the fluid mixture passing through the booster.

Referring to FIG. 1 there is shown a multi-phase fluid compressor 1 having a rotor 2 of which the rotor speed $\Omega$ is controlled by an angular velocity control unit 3.

A fluid feed conduit 4 is connected to the inlet of the compressor 1 and a fluid discharge conduit 5 is connected to the outlet of the compressor 1.

A fluid density meter 6 is connected to the fluid feed pipe 4 and transmits a signal which is representative of the measured fluid density $\rho$ to the angular velocity control unit 3.

The fluid density meter 6 may be a gradio venturi flowmeter which is described in U.S. Pat. Nos. 4,856,344; 5,361,206 or 3,909,603. Alternatively any other multi-phase flowmeter capable of measuring the fluid mixture density with cut-off frequency suitably chosen in-line with booster characteristics. These could include wet gas tracer methods for spot measurement under stable conditions; however, for on-line direct regulation a continuous measurement would be needed. Such a continuous measurement may detect fluctuations of the mixture density, for instance in slugging conditions, enabling direct speed control. Continuous measurement would be possible using either two separate $\Delta p$ flowmeters in series or one $\Delta p$ flowmeter calibrated for the specific conditions.

The underlying operating principle for the multi-phase pump or compressor according to the invention is the assumption of well-mixed flow (effectively a flow of ideally mixed gas and liquid phases). From fluid flow considerations the best efficiency point (BEP) is derived as a function of mixture density $\rho$ and rotational speed $\Omega$.

The algorithm for speed regulation can support different modes of operation, including:

| | | |
|---|---|---|
| 1. | Maintain constant pressure rise | $\Delta p$ (bar) |
| 2. | Maintain constant total mass flow rate | $\Omega m$ (kg/s) |
| 3. | Maintain constant power consumption | (kW) |

The optimal angular velocity control system of a pump or compressor unit is expressed in these cases as:

$$\Omega = f(\rho)^n \quad (1)$$

Here $\Omega$ and $\rho$ are non-dimensional rotational speed and mixture density, respectively; exponent n is selected in the range between $-1/3$ and $-1$, which depends on the mode of operation and f is a parameter that is uniquely determined by the geometry of the pump or compressor unit and the operating conditions. Its value at the actual operating conditions can be determined from regular performance data, for instance by fitting the observed performance of the actual pump or compressor to the performance predicted by the model.

In all three modes of operation, an increase of mixture density must be compensated by a decrease in angular velocity $\Omega$ of the rotor 2 in order to remain at best efficiency point (BEP). To remain at best efficiency point the characteristic curve shown in FIG. 2 should be followed.

In the embodiment shown in FIG. 1 the rotor 2 is a propeller having two blades of which the sides are coated with polytetrafluorethylene (PTFE) and of which the leading edges have a larger roughness than the sides, e.g. by covering the leading edges with an array of e.g. sandgrains like an array used in sandpaper.

Figure 2:
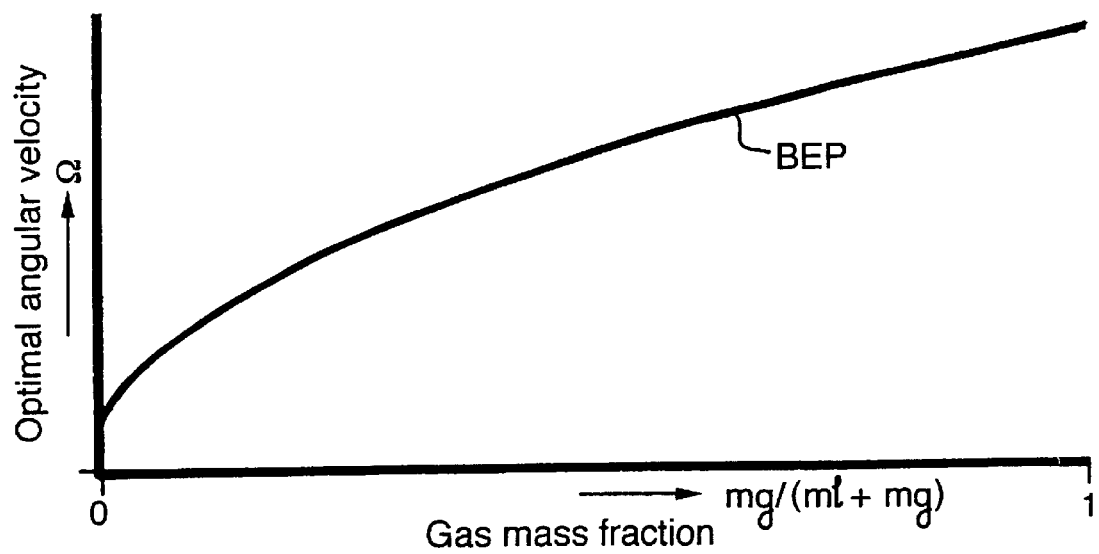
FIG. 2 shows a characteristic curve for operating the booster at its best efficiency point (BEP).

In FIG. 2 the vertical axis represents the angular velocity $\Omega$ of the rotor and the horizontal axis the gas mass fraction $m_g/(m_l+m_g)$.

The BEP curve shown in FIG. 2 is based on scaling theory which estimates the performance of a given pump or compressor under operating conditions. Because the BEP curve is derived from basic fluid mechanics principles, booster performance may be predicted for operating conditions within the parameter range for which experimental data is available. Outside this test range the theory allows to predict best efficiency performance of the pump or compressor with reasonable accuracy. In general compressor or pump performance is characterized with a number of dimensionless groups. For a wet gas compressor these groups can be characterized by assuming that the liquid phase is substantially incompressible and that the gaseous phase is (weakly) compressible.

Application of the rules of dynamic scaling theory under these mixed fluid flow considerations yields formula (1) and the BEP curve shown in FIG. 2.

We claim:

1. The system for optimizing the performance of a rotodynamic multi-phase flow booster, comprising:

a density measure device for measuring the density of a multi-phase flow; and a rotary speed control unit for controlling the speed of rotation of at least one rotor of the booster in accordance with a predetermined algorithm, which controls a dimensionless speed of rotation $\Omega$ of said rotor, characterized in that the density measuring device is located upstream of the flow booster, and in that the dimensionless speed of rotation $\Omega$ is controlled in relation to a measured non-dimensional density $\rho$ of the multi-phase fluid on the basis of the algorithm:

$$\Omega = f.\rho^n$$

wherein:

n is an exponent between $-1/3$ and $-1$ which is selected in relation to a mode of operation; and f is a parameter which is determined by a geometry of the booster and the mode of operation, wherein the mode of operation is selected such that if the fluid mixture density $\rho$ varies either a) the mixture mass flow passing through the booster is maintained at a substantially constant level; or b) a power consumption of the booster is maintained at a substantially constant level; or c) a pressure difference between the outlet and the inlet of the booster is maintained at a substantially constant level.

2. The system of claim 1, wherein the flow booster is a wet gas compressor of which at least one rotor comprises rotor blades having non-wettable sides and a leading edge having a larger roughness than the sides.

3. The system of claim 2, wherein the leading edge of said blades is covered by a random array of grains having a grain size of at least about 50 microns, which grains are separated by distances which are on average less than twice the grainsize.

4. The system claim 2, wherein the leading edge of said blades is provided with a series of riblets which have a square or triangular cross-sectional shape, which are substantially aligned with the direction of flow of the multi-phase fluid mixture and which have mutual spacings of at least about 50 microns.

5. The system of claim 2, wherein the non-wettable sides of the rotor blades comprise a polytetrafluorethylene coating.

6. A blade for use as a rotor or stator blade of a multi-phase flow booster system comprising:

a density measure device for measuring the density of the multi-phase flow; and a rotary speed control unit for controlling the speed of rotation of a rotor of the booster in accordance with a predetermined algorithm, which controls a dimensionless speed of rotation $\Omega$ of said rotor, characterized in that the density measuring device is located upstream of the flow booster, and in that the dimensionless speed of rotation $\Omega$ is controlled in relation to a measured non-dimensional density $\rho$ of the multi-phase fluid on the basis of the algorithm:

$$\Omega = f \cdot \rho^n$$

wherein:

n is an exponent between $-1/3$ and $-1$ which is selected in relation to the mode of operation; and f is a parameter which is determined by a geometry of the booster and a mode of operation, wherein the mode of operation is selected such that if the fluid mixture density $\rho$ varies either a) the mixture mass flow passing through the booster is maintained at a substantially constant level; or b) the power consumption of the booster is maintained at a substantially constant level; or c) a pressure difference between the outlet and the inlet of the booster is maintained at a substantially constant level; wherein the flow booster is a wet gas compressor of which at least one rotor comprises rotor blades having non-wettable sides and a leading edge having a larger roughness than the sides.

7. The blade of claim 6, wherein the leading edge of said blade is covered by a random array of grains having a grain size of at least about 50 microns, which grains are separated by distances which are on average less than twice the grain size.

8. The blade of claim 6, wherein the leading edge of the blade is provided with a series of riblets which have a square or triangular cross-sectional shape, which are substantially aligned with the direction of flow of the multi-phase fluid mixture and which have mutual spacings of at least 50 microns.

9. The blade of claim 6, wherein the non-wettable sides of the blade comprise a polytetrafluorethylene coating.

10. A method for optimizing the performance of a rotodynamic multi-phase flow booster, the method comprising measuring the density of the multi-phase fluid flow; and controlling the speed of rotation of at least one rotor of the pressure booster, characterized in that the density of the multi-phase fluid flow is measured at a location upstream of the rotary pressure booster, and in that a non-dimensional rotational speed $\Omega$ of said rotor is controlled in relation to a measured non-dimensional density $\rho$ of the multi-phase fluid on the basis of the algorithm:

$$\Omega = f \cdot \rho^n$$

wherein:

n is an exponent between $-1/3$ and $-1$ which is selected in relation to a mode of operation; and f is a parameter which is determined by the geometry of the booster and the mode of operation, wherein the mode of operation is selected such that if the fluid mixture density $\rho$ varies either a) the mixture mass flow passing through the booster is maintained at a substantially constant level; or b) the power consumption of the booster is maintained at a substantially constant level; or c) a pressure difference between the outlet and the inlet of the booster is maintained at a substantially constant level.

11. The method of claim 10, wherein the density and/or gas/liquid mass fraction of the multi-phase fluid is measured by a gradio-venturi flowmeter which is located in a conduit upstream of the pressure booster.

12. The method of claim 10, wherein the rotodynamic pressure booster has at least one rotor of which the speed of rotation is adjusted to a predetermined value by means of a rotary speed control unit which is programmed with the algorithm described in claim 1 and which controls the speed of rotation such that the booster operates at its best efficiency point.

13. The method claim 12, wherein at the best efficiency point the impellers of the rotor or rotors of the booster create and maintain favorable fluid flow conditions such as a dispersed mist flow in which liquid droplets are evenly dispersed in the gas phase.

14. The method of claim 10, wherein the flow booster is a wet gas compressor which is located downhole in a gas production well.

15. The method of claim 10, wherein the flow booster is a wet gas compressor which is located above the earth surface.

16. The method of claim 15, wherein the flow booster is a wet gas compressor which is located at the sea bottom or at a remote on-shore location.

* * * * *